UNITED STATES PATENT OFFICE.

EDWARD BOHLIG, OF EISENACH, GERMANY.

IMPROVEMENT IN PURIFYING FEED-WATER FOR BOILERS.

Specification forming part of Letters Patent No. 206,161, dated July 23, 1878; application filed April 6, 1877.

*To all whom it may concern:*

Be it known that I, EDWARD BOHLIG, of Eisenach, Germany, have invented a new and useful Process for Purifying Feed-Water for Steam-Boilers, which process is fully set forth in the following specification.

This invention relates to that class of processes employed for removing or neutralizing all impurities in water used for feeding steam-boilers, through which the incrustation in the same is usually produced; and it consists in mixing oxide of magnesium ($MgO$) with the water to be used and then heating the same.

The advantages of the use of oxide of magnesium consist in the fact that the same, combining with the particles of limestone and bicarbonates generally contained in the water deprives the same of part of their carbonic acid, whereby these ingredients become insoluble, and are, together with the oxide of magnesium, precipitated to the bottom to allow the purified water to be drawn off. The oxide of magnesium being insoluble in water, any excess thereof will not act detrimentally, as is the case with other agents hitherto employed for this purpose, where the least excess in proportion to the quantity of water operated upon, or in proportion to the exact quantity of impurities in the water, produce generally the contrary result from the one desired.

In carrying out my invention I collect any required quantity of water in a suitable tank provided with a steam-coil for heating the water, and mix a quantity of oxide of magnesium with this water, which, after being heated to about 180° and then allowed to settle for a short time—say, about one-quarter of an hour—will then be ready to be drawn off for use to feed the boilers, all impurities detrimental to the iron, and generally causing the incrustation in the steam-boiler, having settled in the bottom of the tank.

What I claim as my invention, and desire to secure by Letters Patent, is—

The process of purifying water to be used in steam-boilers, which consists in mixing oxide of magnesium therewith in a separate tank or vessel, then heating the water, as described, and allowing it to settle before feeding it to the steam-boiler, substantially as and for the purpose herein specified.

EDWARD BOHLIG.

Witnesses:
 FRANZ WIRTH,
 FRANZ HASSLACHER.